(12) United States Patent
Hanchi et al.

(10) Patent No.: US 6,967,805 B1
(45) Date of Patent: Nov. 22, 2005

(54) IN-SITU MONITORING OF PROXIMITY AND CONTACT BETWEEN A SLIDER AND A DISC IN A DISC DRIVE

(75) Inventors: Jorge Vicente Hanchi, St. Louis Park, MN (US); Lijun Fu, Shakopee, MN (US); Ram M. Rao, Shoreview, MN (US); Lee C. Knippenberg, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 201 days.

(21) Appl. No.: 10/385,579

(22) Filed: Mar. 11, 2003

Related U.S. Application Data

(63) Continuation-in-part of application No. 10/119,178, filed on Apr. 9, 2002, now Pat. No. 6,700,724.

(60) Provisional application No. 60/418,118, filed on Oct. 11, 2002.

(51) Int. Cl.$^7$ .............................................. G11B 21/02
(52) U.S. Cl. ..................................................... 360/75
(58) Field of Search .............................. 360/75, 25, 46, 360/78.14, 77.03

(56) References Cited

U.S. PATENT DOCUMENTS

| | | | |
|---|---|---|---|
| 4,777,544 A | 10/1988 | Brown et al. ................. 360/75 |
| 6,003,364 A | 12/1999 | Yao et al. ...................... 73/105 |
| 6,008,640 A | 12/1999 | Tan et al. .................... 324/212 |
| 6,046,596 A | 4/2000 | Schaenzer et al. .......... 324/662 |
| 6,105,421 A | 8/2000 | Yao et al. ...................... 73/105 |
| 6,196,062 B1 | 3/2001 | Wright et al. ................. 73/105 |
| 6,269,687 B1 | 8/2001 | Zhang et al. .................. 73/105 |
| 6,359,746 B1 * | 3/2002 | Kakekado et al. ............ 360/75 |
| 6,407,874 B1 | 6/2002 | Smith et al. ................... 360/25 |
| 6,411,458 B1 | 6/2002 | Billings et al. ............... 360/75 |
| 6,445,447 B1 | 9/2002 | Wang ....................... 356/237.2 |
| 6,456,213 B1 | 9/2002 | Seng et al. .................. 341/126 |

OTHER PUBLICATIONS

Imai et al, Fundamental Study on a Thin-Film AE Sensor for Measurement of Behavior of a Multi-Pad Contact Slider, IEEE Transaction on Magnetics, vol. 32, No. 5, Sep. 1996, pp. 3675-3677.

* cited by examiner

*Primary Examiner*—David Hudspeth
*Assistant Examiner*—Mitchell Slavitt
(74) *Attorney, Agent, or Firm*—Kinney & Lange, P.A.

(57) ABSTRACT

A method of detecting contact between a transducing head-carrying slider and a rotatable disc is performed by applying an electrostatic voltage between the slider and the disc and monitoring current flow across an interface between the slider and the disc. The monitored current flow across the interface between the slider and the disc is analyzed to detect contact between the slider and the disc.

18 Claims, 6 Drawing Sheets

IN-SITU MONITORING OF PROXIMITY AND CONTACT BETWEEN A SLIDER AND A DISC IN A DISC DRIVE

CROSS-REFERENCE TO RELATED APPLICATION(S)

This application is a continuation-in-part of U.S. application Ser. No. 10/119,178 filed Apr. 9, 2002 now U.S. Pat. No. 6,700,724 for "Contact Detection And Calibration For Electrostatic Fly Height Control In A Disc Drive" by J. Riddering and L. Knippenberg.

This application claims the benefit of Provisional Application No. 60/418,118 filed Oct. 11, 2002 for "In-Situ Technique For The Monitoring Of Head-Disc Contact In Magnetic Disc Files" by J. Hanchi, L. Fu, R. Rao and L. Knippenberg.

INCORPORATION BY REFERENCE

The aforementioned U.S. application Ser. No. 10/119,178 and Provisional Application No. 60/418,118 are hereby incorporated by reference in their entirety.

BACKGROUND OF THE INVENTION

The present invention relates to a system for sensing contact between a slider and a rotating disc in a disc drive, and more particularly to an in-situ technique for detecting slider-disc contact in which an electrostatic voltage is applied between the head and the disc to allow detection of contact.

As the density of data recorded on magnetic discs continues to increase, it is becoming necessary for the spacing between the transducing head carried by the slider and the disc to decrease to very small distances. Spacings of well below 10 nano-meters (nm) are required in some applications. In disc drive systems having such small slider-disc spacing, the possibility of contact between the slider and the disc is relatively high, due to factors such as slider manufacturing process limitations and limited air-bearing modeling capabilities. A system for detecting such contacts is useful for a number of diagnostic tests, enabling assessments such as component-level flyability and durability, drive-level reliability, and production-level screening to be made, as well as providing input to fly-height calibration and adaptive-fly-control systems that enable dynamic adjustment of flying height in certain disc drive systems.

Existing methods of detecting contact between a slider and a disc typically involve acoustic emission (AE) monitoring by an external AE sensor such as a piezoelectric element having suitable frequency response and sensitivity. While AE sensors are generally effective to detect high intensity and catastrophic slider-disc contact events, their detection abilities are somewhat limited. The use of an external sensor limits the AE sensor's sensitivity to remotely occurring slider-disc contact events. The physical dimensions of the AE sensor also preclude optimum placement of the sensor in many component-level testing arrangements. Furthermore, the effectiveness of conventional AE sensors may be severely limited by the introduction of polymer-based ("flex") gimbals, due to the heavy AE attenuation of such gimbals, which act as a high acoustic impedance component between the slider-disc interface and the suspension.

There is a need in the art for an improved apparatus and method for sensing contact between a slider and a disc, both in operative disc drive systems and in testing applications.

BRIEF SUMMARY OF THE INVENTION

The present invention is a method of detecting contact between a transducing head-carrying slider and a rotatable disc. An electrostatic voltage is applied between the slider and the disc, and current flow across an interface between the slider and the disc is monitored. The monitored current flow across the interface between the slider and the disc is analyzed to detect contact between the slider and the disc.

DETAILED DESCRIPTION

Figure 1:
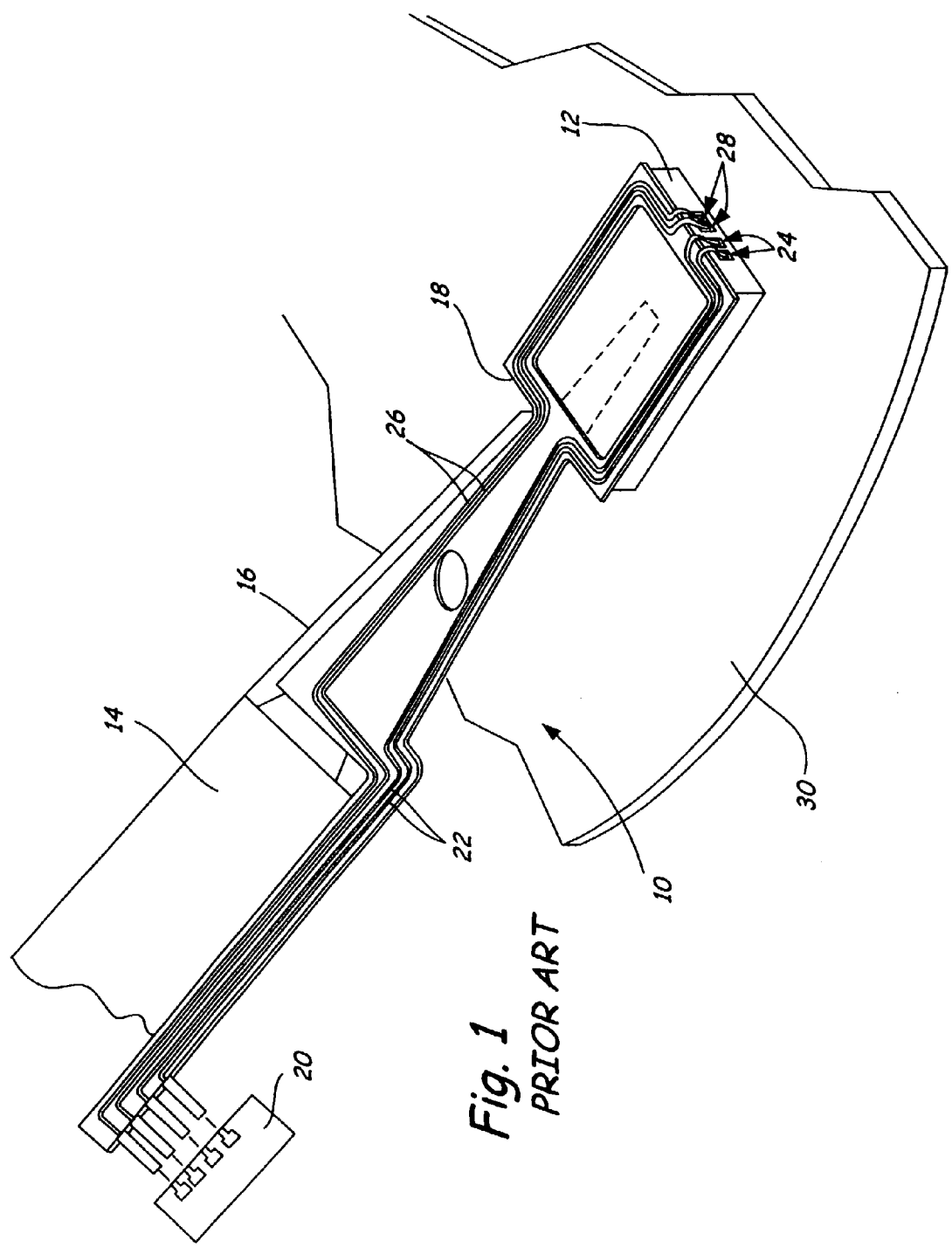
FIG. 1 is a perspective view of a portion of a typical, exemplary disc drive illustrating the structure and configuration for mechanically supporting and electrically connecting a slider.

FIG. 1 is a perspective view of a portion 10 of a typical, exemplary disc drive illustrating the structure and configuration for mechanically supporting and electrically connecting slider 12. Support arm 14 is connected to load beam 16, which in turn supports flexure 18 which carries slider 12 over the surface of a rotating disc. Slider 12 is also electrically connected to a drive circuit 20, with conductive traces 22 connecting drive circuit 20 to read head contacts 24, and conductive traces 26 connecting drive circuit 20 to write head contacts 28. Conductive traces 22 and 24 are formed on a polyimide flex circuit, which is typically a structure separate from flexure 18 but could in some embodiments make up flexure 18 itself. The structure supports slider 12 over the surface of disc 30, allowing data to be transduced therebetween. It will be understood that the configuration shown in FIG. 1 is only one example of a slider support and connection structure for a disc drive or testing system, and that the example given in FIG. 1 is intended only to convey the general context for the present invention.

In typical systems such as the one shown in FIG. 1, an acoustic emission (AE) sensor, such as a piezoelectric sensor, is attached to the slider support system or to slider 12 itself in order to detect contact between slider 12 and disc 30. The potential limitations of AE sensors are discussed above. The present invention proposes the use of an in-situ sensor for detecting contact between slider 12 and disc 30 by applying an electrostatic voltage across the head-disc interface and measuring the change in current flowing across that interface due to contact events between slider 12 and disc 30.

In order to implement the in-situ head-disc contact system of the present invention, few structural changes need to be made to a typical slider support configuration. A voltage difference must be applied between slider 12 and disc 30 to induce current across the head-disc interface. In typical disc drives, both slider 12 and disc 30 are grounded. Thus, a voltage must be applied to either slider 12 or to disc 30. Typical sliders are already provided with a ground path through which a voltage can be applied, thus requiring no additional structure and making this option attractive. Alternatively, the voltage could be applied to the disc while leaving the slider grounded, which would require some additional structure because of the need for the disc to retain its path to ground. However, the incorporation of this structure is well within the abilities of one skilled in this art.

Figure 2:
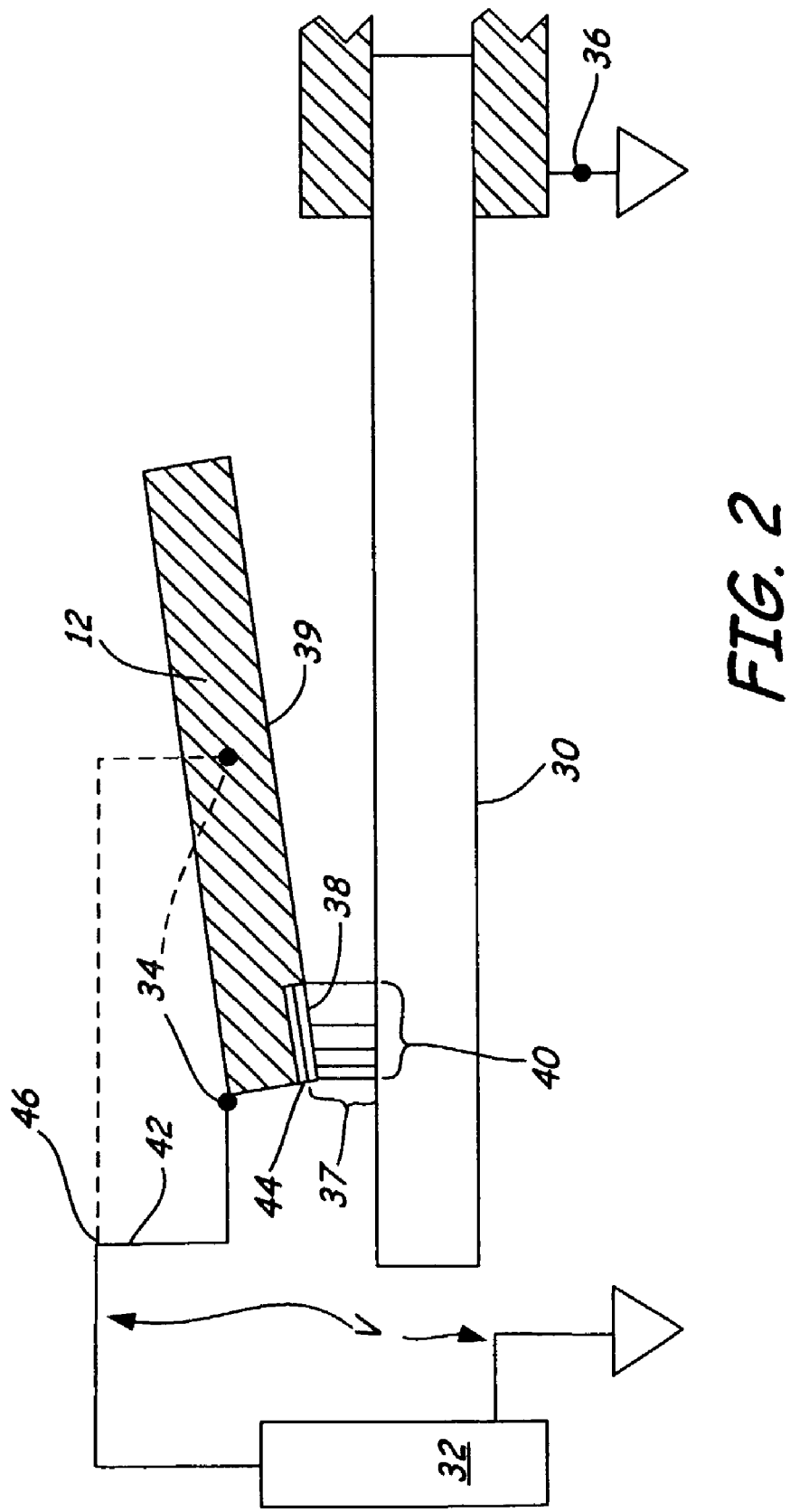
FIG. 2 is a simplified diagram of a slider and a disc employing an in-situ slider-disc contact sensing system according to the present invention.

FIG. 2 is a simplified diagram of slider 12 and disc 30 employing an in-situ slider-disc contact sensing system according to the present invention, illustrating that the sensing system can be implemented without substantial addition to conventional slider and disc structures. Slider 12 is connected to sensing circuitry 32, which is operable to generate control voltage V at electrical connection 34 so that sensing circuitry 32 can sense the current flowing across the interface between slider 12 and disc 30. Disc 30 is connected at disc electrical connection 36 to a common conductor as shown. Stray electrical paths from slider 12 to the common conductor are reduced or eliminated so that slider 12 (or a portion of it) can be charged relative to disc 30. Slider 12 acts as a first capacitor plate, and the portion of disc 30 that faces slider 12 acts as a second capacitor plate. The two capacitor plates are separated by air gap 37 (which includes a lubricant film and a diamond-like carbon (DLC) overcoat between the plates in an exemplary embodiment), and a current flows across air gap 37 between the plates when a voltage is applied to slider electrical connection 34 and to disc electrical connection 36.

In one embodiment, first electrode 38 is formed on at least a portion of air-bearing surface 39 of slider 12, and second electrode 40 is formed on a portion of disc 30 that faces first electrode 38. Second electrode 40 has a shape that is defined by the facing shape of first electrode 38 that overlies it. Control signal V is generated by sensing circuitry 32 and is coupled by electrical conductors to first electrode 38 along line 42. First electrode 38 can be a metallization that is insulated from the main body of slider 12 by insulating layer 44. Alternatively, slider 12 itself can be connected to sensing circuitry along line 46 and entire slider 12 can serve as the first electrode. The voltage difference V between the first and second electrodes causes a current to flow therebetween, which will change when slider 12 contacts disc 30 to enable detection of slider-disc contact events.

Figure 3:
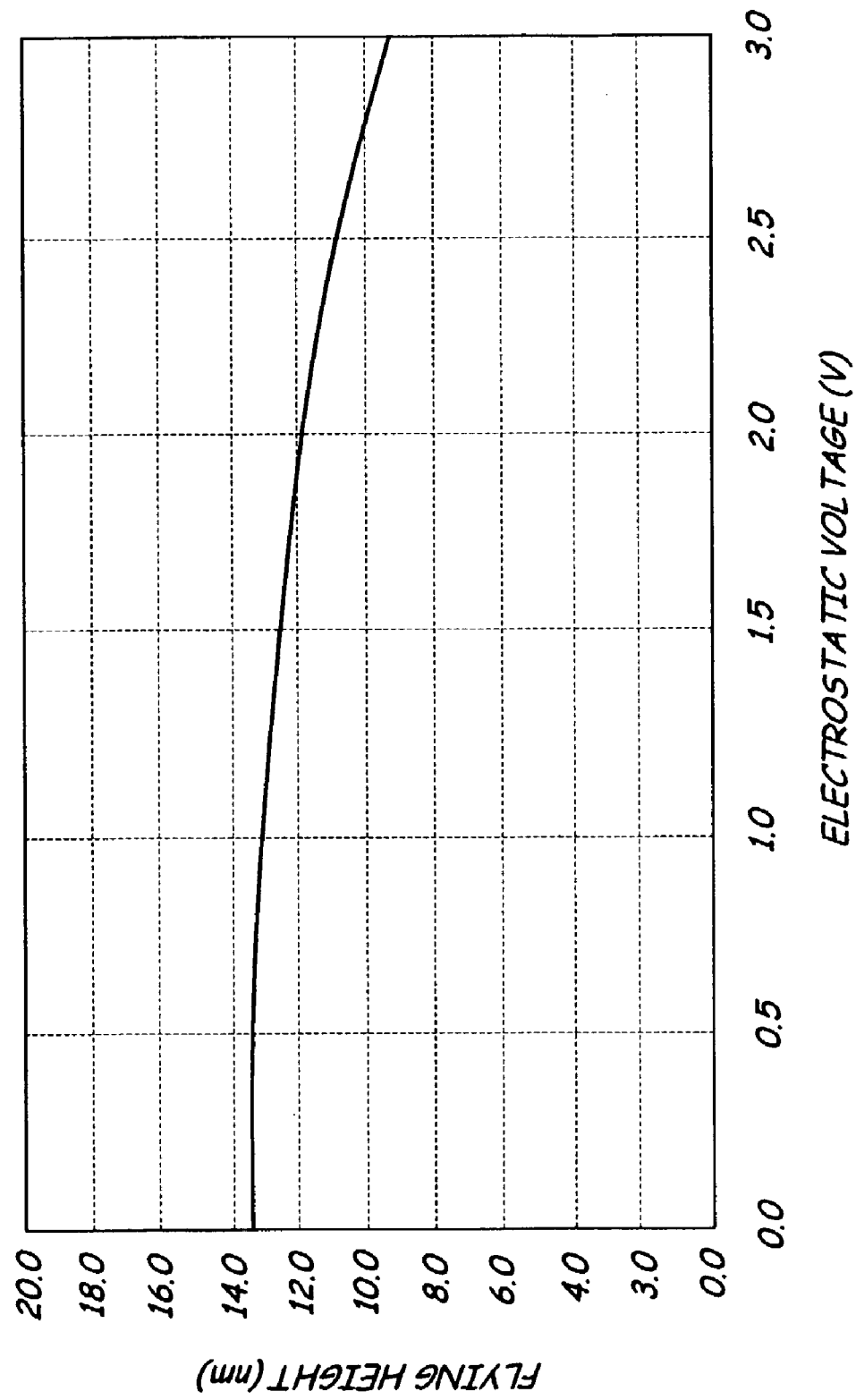
FIG. 3 is a graph illustrating the variation of flying height between a slider and a disc as a function of applied voltage therebetween.

FIG. 3 is a graph illustrating the variation of flying height between a slider and a disc as a function of applied voltage therebetween. Applying an electrostatic voltage between a slider and disc will cause a Coulomb force of attraction between them, governed by the following equation:

$$F_c(h) = 0.5 E^2 \frac{\delta C(h)}{\delta h} \quad \text{(Eq. 1)}$$

where $F_c$ is the Coulomb force, E is the applied electrostatic voltage, C is the slider-disc capacitance, and h is the flying height between the slider and the disc. Thus, for the in-situ sensing technique of the present invention to be effective, the voltage applied between the slider and the disc must not be so large that the flying height is significantly affected. The graph of FIG. 3 shows that for an exemplary configuration, an electrostatic voltage of up to 500 milli-Volts (mV) results in a minimal flying height variation. Specifically, the flying height variations for given value of applied electrostatic voltage shown in FIG. 3 are as follows:

TABLE 1

| Applied voltage (Volts) | Flying height (nanometers (nm)) | Change in flying height from nominal (nm) |
| --- | --- | --- |
| 0.0 | 13.3 | 0.0 |
| 0.5 | 13.2 | −0.1 |
| 1.0 | 13.0 | −0.3 |
| 1.5 | 12.5 | −0.8 |
| 2.0 | 11.8 | −1.5 |
| 2.5 | 10.8 | −2.5 |
| 3.0 | 9.4 | −3.9 |

These results indicate that higher applied voltages result in greater flying height variations. The level of flying height variation that is tolerable will depend on the specific application in which the in-situ head-disc contact detection system of the present invention is employed.

Figure 4B:
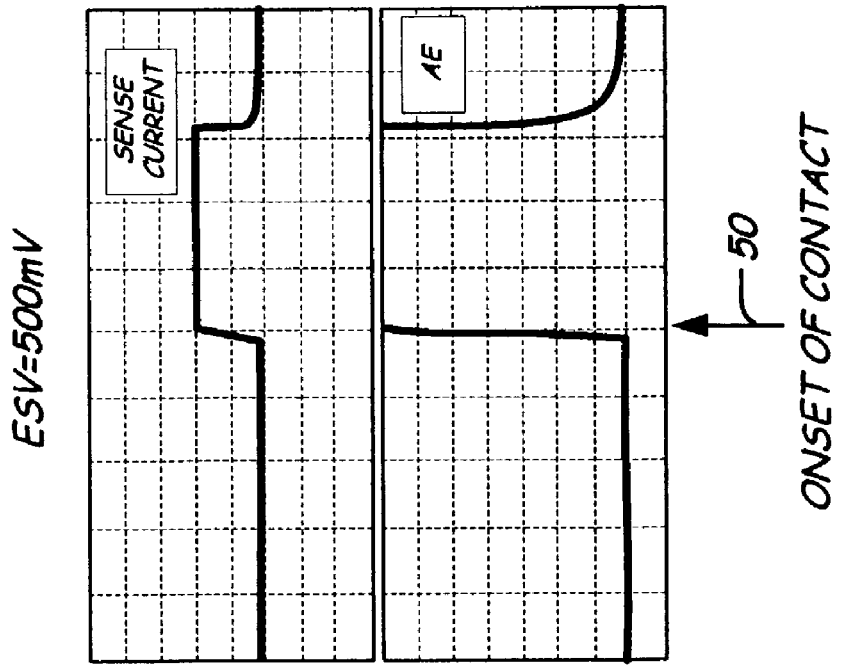
FIGS. 4A and 4B are graphs illustrating the results of testing performed in an exemplary slider support configuration to compare the response of the in-situ slider-disc contact detection system of the present invention and an AE sensor according to the prior art.
Figure 4A:
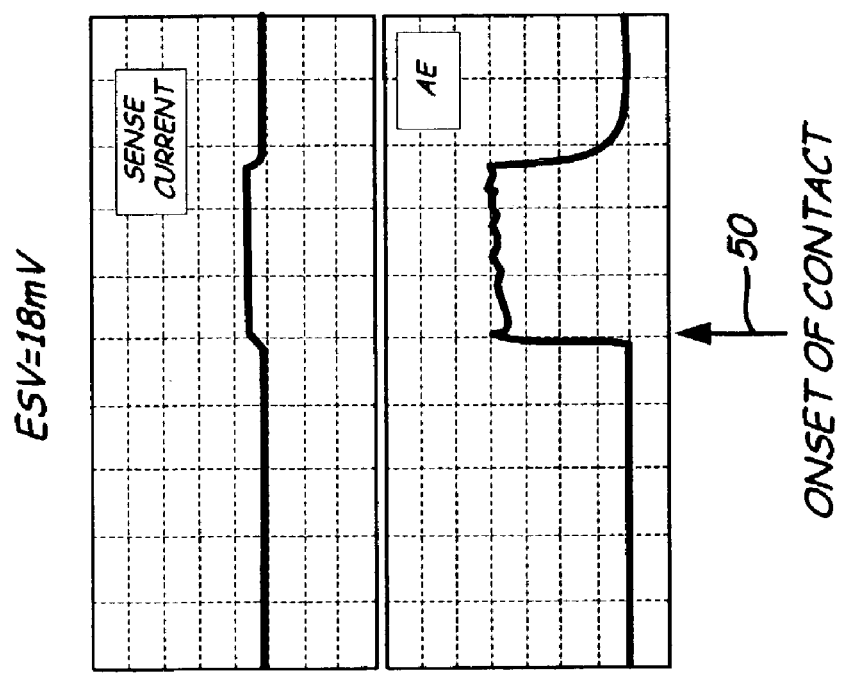

FIGS. 4A and 4B are graphs illustrating the results of testing performed in an exemplary slider support configuration to compare the response of the in-situ slider-disc contact detection system of the present invention and an AE sensor according to the prior art. FIG. 4A shows the results of a test performed with an electrostatic voltage of 18 mV applied between the slider and the disc, where the onset of continuous slider-disc contact occurs at the time denoted by reference numeral 50. FIG. 4B shows the results of a test performed with an electrostatic voltage of 500 mV applied between the slider and the disc, where the onset of continuous slider-disc contact again occurs at the time denoted by reference numeral 50. The test results shown in FIGS. 4A and 4B illustrate that virtually equal sensitivity to the onset of continuous slider-disc contact exists for all applied electrostatic voltages. Although the magnitude of the change in current flowing across the slider-disc interface varies slightly, the time at which an appreciable change in current flow occurs is consistent, and can be detected to indicate slider-disc contact. Thus, applied electrostatic voltage does not have a significant effect on the sensitivity of the in-situ slider-disc contact detection system of the present invention with respect to continuous contact events.

Figure 5:
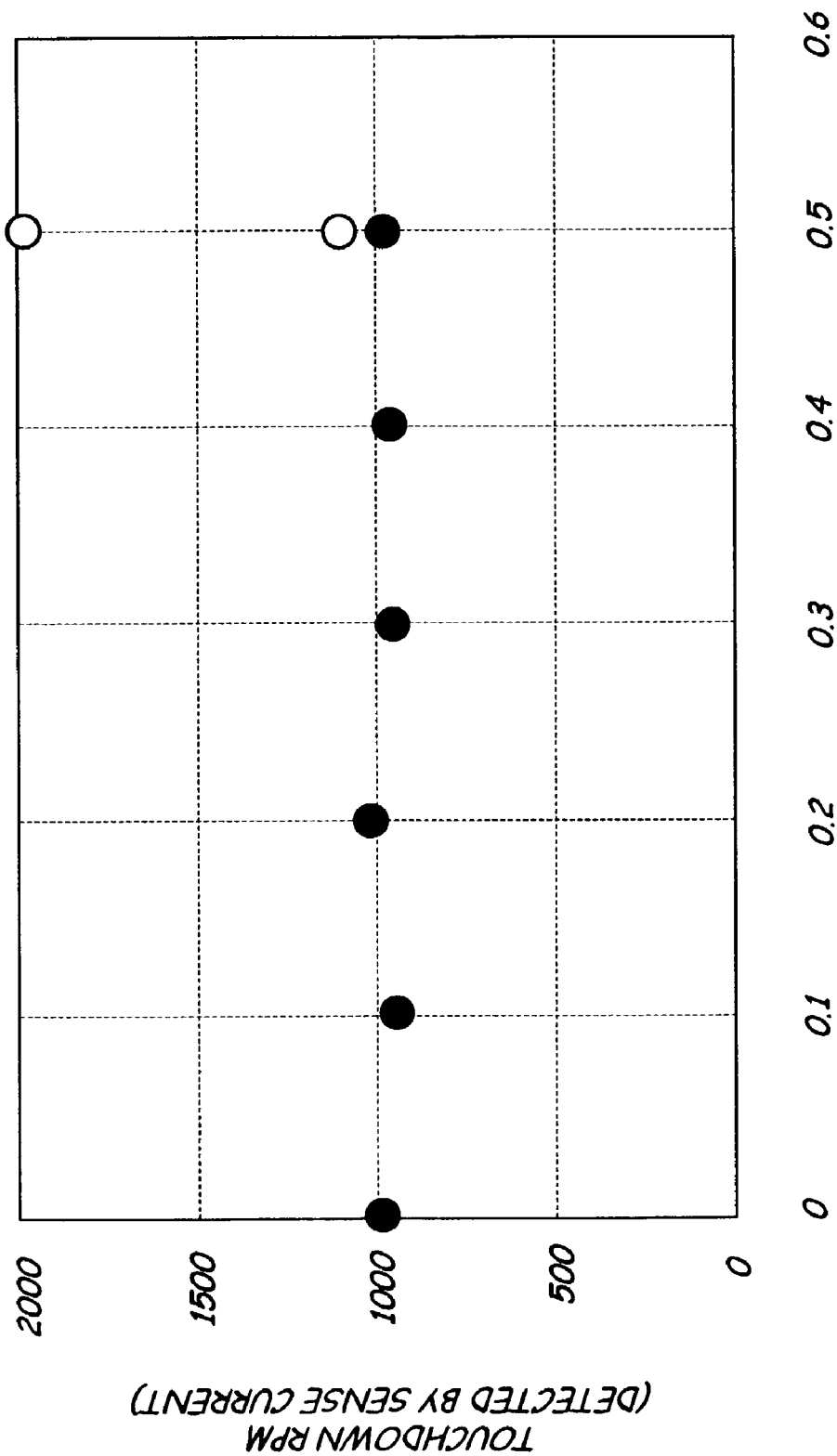
FIG. 5 is a graph illustrating the results of testing performed in an exemplary slider support configuration, having various touchdown RPM and various electrostatic voltages applied between the slider and disc according to the in-situ slider-disc detection system of the present invention.

FIG. 5 is a graph illustrating the results of testing performed in an exemplary slider support configuration, having various touchdown RPM and various electrostatic voltages applied between the slider and disc according to the in-situ slider-disc detection system of the present invention. These test results indicate that while continuous contact between the slider and disc (occurring at 1000 RPM) is detectable at all applied voltages, "ultra-light" intermittent contact events (and even "near-proximity" events in some cases) prior to the onset of continuous slider-disc contact (represented by RPM of up to 2000) are only detectable for higher applied voltages, such as 500 mV in the testing whose results are shown in FIG. 5.

Figure 6:
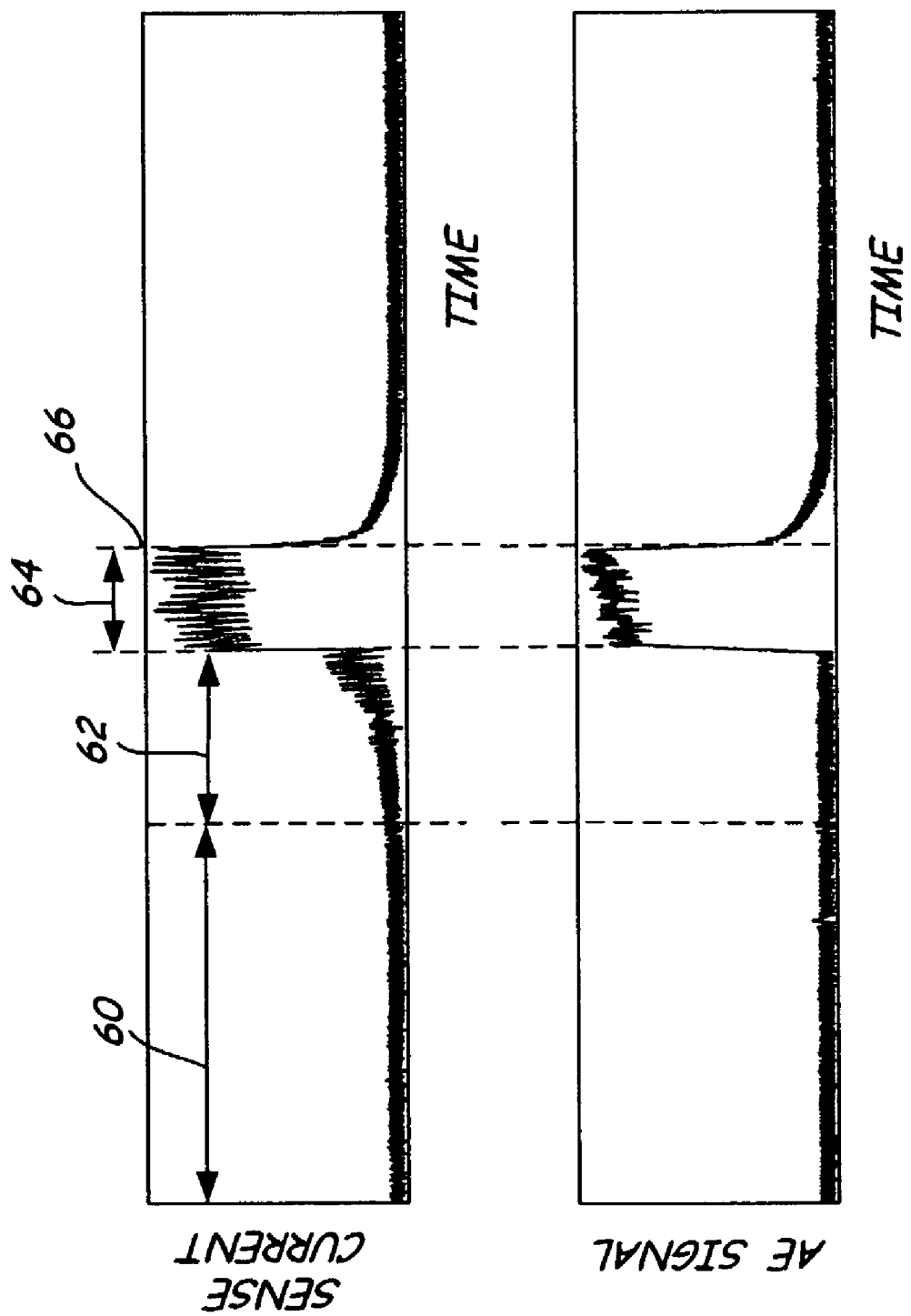
FIG. 6 is a graph illustrating the results of testing performed in an exemplary slider support configuration to compare the response of the in-situ slider- disc contact detection system of the present invention and an AE sensor according to the prior art, in varying slider-disc contact scenarios.

FIG. 6 is a graph illustrating the results of testing performed in an exemplary slider support configuration to compare the response of the in-situ slider-disc contact detection system of the present invention and an AE sensor according to the prior art, in varying slider-disc contact scenarios. The current sensed by the in-situ system of the present invention (with an applied electrostatic voltage of 500 mV) is shown in the top portion of the graph, and the voltage output from an AE sensor is shown in the bottom graph. The test involves a regular flying (non-contact) scenario during time 60, "near-proximity" and/or "ultra-light" contact between the slider and disc during time 62, and continuous contact between the slider and disc during time 64. The test was terminated by unloading the slider at time 66. This test shows that while both the in-situ sensing system of the present invention and the prior art AE sensor system are able to detect continuous contact between the slider and the disc (occurring during time 64), only the in-situ sensing system of the present invention has enough sensitivity to detect ultra-light contact between the slider and the disc (occurring during time 62).

The present invention provides an in-situ sensing system for detecting contact between a slider and a rotating disc. The system is able to detect contact events by applying an electrostatic voltage between the slider and the disc, and sensing the current flowing across the head-disc interface (which will change as the slider contacts the disc). The voltage applied between the slider and the disc is selected so that the Coulomb force of attraction therebetween does not significantly affect the flying height of the slider. This sensing system has excellent sensitivity to light contact and "near-contact" or "near-proximity" phenomena between the slider and the disc, since a change in current flow across the slider-disc interface can occur when slider-disc spacing becomes sufficiently small without continuous or violent contact. The sensing system of the present invention therefore has greater sensitivity that prior AE sensors, and does not suffer from many of the limitations of such sensors. The sensing system of the present invention also has numerous advantages over "readback" type sensing systems, particularly because it does not require the slider to have the read/write transducing elements completed in order to assess the mechanical "flyability" and durability of components and disc drives.

The sensing system of the present invention may be used in a number of disc drive-related applications. It may be employed in a spinstand tester for assessing component-level flyability and durability. It might also be used for drive-level reliability assessment of disc drives, both in their early mechanical phases and in fully functional drives. Screening of head gimbal assemblies (HGAs) in pre-production phases as well as production phases is possible with the present invention, whether the HGA employs a conventional metal gimbal or a "flex" (polymer-based) gimbal. The system of the present invention may also be employed in disc drive systems which adaptively control the flying height of the slider, as a mechanism to ensure that the adjustment of flying height does not result in undesirable levels of slider-disc contact. Those skilled in the art will recognize that still further applications may exist for the system of the present invention due to its versatility and broad level of efficacy.

Although the present invention has been described with reference to preferred embodiments, workers skilled in the art will recognize that changes may be made in form and detail without departing from the spirit and scope of the invention.

What is claimed is:

1. A method of detecting contact between a transducing head-carrying slider and rotatable disc, comprising:
   applying an electrostatic voltage between the slider and the disc;
   monitoring current flow across an interface between the slider and the disc; and
   analyzing the monitored current flow across the interface between the slider and the disc to detect contact between the slider and the disc.

2. The method of claim 1, wherein applying an electrostatic voltage between the slider and the disc comprises:
   setting a control voltage on the slider; and
   grounding the disc.

3. The method of claim 2, wherein setting a control voltage on the slider comprises:
   providing an isolated electrode on the slider; and
   electrically connecting the control voltage to the electrode.

4. The method of claim 2, wherein setting a control voltage on the slider comprises:
   electrically connecting the control voltage to the slider.

5. The method of claim 1, wherein applying an electrostatic voltage between the slider and the disc comprises:
   grounding the slider; and
   setting a control voltage on the disc.

6. The method of claim 1, wherein the electrostatic voltage applied between the slider and the disc is selected to have at least a magnitude at which the current flow across the interface between the slider and the disc indicates contact between the slider and the disc for intermittent contact events prior to the onset of continuous contact therebetween.

7. A method of detecting contact between a transducing head-carrying slider and rotatable disc, comprising:
   applying an electrostatic voltage between the slider and the disc, the electrostatic voltage being selected to be below a level at which a force of attraction between the slider and the rotatable disc causes significant reduction of a flying height distance between the slider and the disc;
   monitoring current flow across an interface between the slider and the disc; and
   analyzing the monitored current flow across the interface between the slider and the disc to detect contact between the slider and the disc.

8. The method of claim 7, wherein the electrostatic voltage applied between the slider and the disc is no greater than about 500 milli-Volts.

9. The method of claim 7, wherein applying an electrostatic voltage between the slider and the disc comprises:
   setting a control voltage on the slider; and
   grounding the disc.

10. The method of claim 9, wherein setting a control voltage on the slider comprises:
    providing an isolated electrode on the slider; and
    electrically connecting the control voltage to the electrode.

11. The method of claim 9, wherein setting a control voltage on the slider comprises:
    electrically connecting the control voltage to the slider.

12. The method of claim 7, wherein applying an electrostatic voltage between the slider and the disc comprises:
    grounding the slider; and
    setting a control voltage on the disc.

13. A method of detecting contact and near proximity between a transducing head-carrying slider and rotatable disc, comprising:

applying an electrostatic voltage between the slider and the disc;

monitoring current flow across an interface between the slider and the disc; and analyzing the monitored current flow across the interface between the slider and the disc to detect contact and near proximity between the slider and the disc, wherein the electrostatic voltage applied between the slider and the disc is selected to have at least a magnitude at which the current flow across the interface between the slider and the disc indicates near proximity and contact between the slider and the disc for a proximity between the slider and the disc below a threshold distance and for intermittent contact events prior to the onset of continuous contact between the slider and the disc.

14. The method of claim 13, wherein the electrostatic voltage applied between the slider and the disc is about 500 milli-Volts.

15. The method of claim 13, wherein applying an electrostatic voltage between the slider and the disc comprises:

setting a control voltage on the slider; and grounding the disc.

16. The method of claim 15, wherein setting a control voltage on the slider comprises:

providing an isolated electrode on the slider; and electrically connecting the control voltage to the electrode.

17. The method of claim 15, wherein setting a control voltage on the slider comprises:

electrically connecting the control voltage to the slider.

18. The method of claim 13, wherein applying an electrostatic voltage between the slider and the disc comprises:

grounding the slider; and setting a control voltage on the disc.

* * * * *